(12) United States Patent
Xu et al.

(10) Patent No.: US 12,527,393 B2
(45) Date of Patent: Jan. 20, 2026

(54) OSCILLATING TOOTHBRUSH

(71) Applicant: SHANGHAI SHIFT ELECTRICS CO., LTD., Shanghai (CN)

(72) Inventors: Zhenwu Xu, Shanghai (CN); Xiaoguo Dai, Shanghai (CN)

(73) Assignee: SHANGHAI SHIFT ELECTRICS CO., LTD., Shanghai (CN)

( * ) Notice: Subject to any disclaimer, the term of this patent is extended or adjusted under 35 U.S.C. 154(b) by 419 days.

(21) Appl. No.: 18/260,477

(22) PCT Filed: Apr. 26, 2022

(86) PCT No.: PCT/CN2022/089204
§ 371 (c)(1),
(2) Date: Jul. 6, 2023

(87) PCT Pub. No.: WO2023/020000
PCT Pub. Date: Feb. 23, 2023

(65) Prior Publication Data
US 2024/0299147 A1    Sep. 12, 2024

(30) Foreign Application Priority Data
Aug. 17, 2021 (CN) .......................... 202121936520.5

(51) Int. Cl.
*A46B 5/00* (2006.01)
*A46B 7/06* (2006.01)
(Continued)

(52) U.S. Cl.
CPC .............. *A46B 5/0058* (2013.01); *A46B 7/06* (2013.01); *A46B 9/04* (2013.01); *A61C 17/32* (2013.01);
(Continued)

(58) Field of Classification Search
CPC ........... A46B 7/06; A46B 9/04; A46B 5/0058; A46B 2200/1066; A61C 17/32; A61C 17/3472; A61C 17/225
(Continued)

(56) References Cited

U.S. PATENT DOCUMENTS 9,456,885 B2 * 10/2016 Fatiny .................. A61C 17/222
2006/0168744 A1   8/2006 Butler et al.
(Continued)

FOREIGN PATENT DOCUMENTS

CN          1280466 A    1/2001
CN          1317295 A    10/2001
(Continued)

OTHER PUBLICATIONS

English translation of DE 3423039 A1, Schmidt-Bogatzky et al., 1986. (Year: 1986).*
International Search Report of PCT/CN2022/089204.

*Primary Examiner* — Laura C Guidotti
(74) *Attorney, Agent, or Firm* — Kilpatrick Townsend & Stockton LLP (57) ABSTRACT

This application provides an oscillating toothbrush, including a brush head, a brush handle, an oscillating base mounted on the brush handle, and an oscillating rod that connects the brush head to the oscillating base, and the oscillating base includes a first hinge base hinged to the brush handle in a first direction, a second hinge base hinged to the brush handle in a second direction, and a fixing shaft mounted on the first hinge base in the second direction, with the first direction being perpendicular to the second direction. In the present application, the oscillating base is arranged to include the first hinge base hinged to the brush handle in the first direction and the second hinge base hinged to the brush handle in the second direction. When the brush head is subjected to an external force, the oscillating rod (Continued)

may drive the first hinge base to oscillate on the brush handle in the first direction. In one embodiment, the oscillating rod oscillates on the fixing shaft in the second direction to further drive the second hinge base to oscillate on the brush handle in the second direction. Therefore, with the oscillation of the first hinge base and the second hinge base, the brush head is allowed to oscillate at multiple angles under external forces in different directions, to improve the comfort of toothbrushing.

10 Claims, 7 Drawing Sheets (51) Int. Cl.
*A46B 9/04* (2006.01)
*A61C 17/22* (2006.01)
*A61C 17/32* (2006.01)
*A61C 17/34* (2006.01)
(52) U.S. Cl.
CPC ..... *A46B 2200/1066* (2013.01); *A61C 17/225* (2013.01); *A61C 17/3472* (2013.01)

(58) Field of Classification Search
USPC .............................................. 15/167.1, 144.2
See application file for complete search history.

(56) References Cited

U.S. PATENT DOCUMENTS

| | | | |
|---|---|---|---|
| 2008/0115300 | A1 | 5/2008 | Spooner et al. |
| 2009/0235471 | A1* | 9/2009 | Yamada ................... B25F 5/02 |
| | | | 15/22.1 |

FOREIGN PATENT DOCUMENTS

| | | | | |
|---|---|---|---|---|
| CN | 2683063 | Y | 3/2005 | |
| CN | 206994831 | U | 2/2018 | |
| CN | 108652770 | A | 10/2018 | |
| CN | 112261917 | A | 1/2021 | |
| CN | 213820252 | U | 7/2021 | |
| CN | 215649704 | U | 1/2022 | |
| DE | 3423039 | A1 * | 1/1986 | ............... A46B 9/04 |
| JP | H1080320 | A | 3/1998 | |
| JP | 2006055194 | A | 3/2006 | |
| TW | M448991 | U | 3/2013 | |

* cited by examiner

OSCILLATING TOOTHBRUSH

FIELD

The present application belongs to the field of daily necessities, and in particular, to an oscillating toothbrush.

BACKGROUND ART

Toothbrushes are a necessity for people to wash up in daily life. With the continuous improvement of people's living standards, functions of toothbrushes are expanding, not only for convenience in use, but also for comfort.

However, existing toothbrushes are usually molded in one piece, and during toothbrushing, a brush head of the toothbrush cannot adapt to a tooth cleaning process, to reduce the comfort of toothbrushing due to low flexibility of the brush head.

SUMMARY OF THE DISCLOSURE

Embodiments of this application are intended to provide an oscillating toothbrush to solve the problem in the related art that the comfort of toothbrushing is reduced due to low flexibility of a brush head.

The embodiments of this application are as follows.

Provided is an oscillating toothbrush, including a brush head, a brush handle, an oscillating base mounted on the brush handle, and an oscillating rod that connects the brush head to the oscillating base, the oscillating base including a first hinge base hinged to the brush handle in a first direction, a second hinge base hinged to the brush handle in a second direction, and a fixing shaft mounted on the first hinge base in the second direction; and the second hinge base is above the first hinge base, and one end of the oscillating rod away from the brush head passes through the second hinge base and sleeves over the fixing shaft, the first direction being perpendicular to the second direction.

With this structure, in this application, the oscillating base is arranged to include the first hinge base hinged to the brush handle in the first direction and the second hinge base hinged to the brush handle in the second direction. When the brush head is subjected to an external force, the oscillating rod may drive the first hinge base to oscillate on the brush handle in the first direction. In one embodiment, the oscillating rod oscillates on the fixing shaft in the second direction to further drive the second hinge base to oscillate on the brush handle in the second direction. Therefore, with the oscillation of the first hinge base and the second hinge base, the brush head is allowed to oscillate at multiple angles under external forces in different directions, to improve the comfort of toothbrushing.

In an embodiment, the second hinge base is provided with an elongated hole for the oscillating rod to pass through, and the direction of major axis of the elongated hole is set along the second direction.

With this structure, the oscillating base may achieve avoidance in the second direction by means of the elongated hole.

In an embodiment, each of two ends of the first hinge base is provided with a first journal, and a central axis of the first journal is set along the first direction; and the brush handle includes a handle body and a cover mounted on the handle body, the handle body is provided with first recesses at positions corresponding to the first journals, and the cover is provided with second recesses that match the respective first recesses to clamp the respective first journals.

With this structure, the first recesses and the respective second recesses match with each other to clamp the respective first journals, and the stability of connection between the first hinge base and the brush handle may be improved, and the reliability of oscillation of the first hinge base may also be improved.

In an embodiment, each of two ends of the second hinge base is provided with a second journal, and a central axis of the second journal is set along the second direction; and the handle body is provided with third recesses at positions corresponding to the second journals, and the cover is provided with fourth recesses that match the third recesses to clamp the respective second journals.

With this structure, the third recesses and the respective fourth recesses match with each other to clamp the respective second journals, and the stability of connection between the second hinge base and the brush handle may be improved, and the reliability of oscillation of the second hinge base may also be improved.

In an embodiment, the cover is provided with a through hole for the oscillating rod to pass through.

With this structure, the oscillating rod may be stopped by an inner side wall of the through hole, and an oscillating angle of the oscillating rod may be limited.

In an embodiment, the oscillating toothbrush further includes a resilient abutting-pushing unit for resilient pushing of the oscillating rod to a state of initial position, with one end of the resilient abutting-pushing unit abutting against the brush handle, and the other end of the resilient abutting-pushing unit abutting against the oscillating base.

With this structure, when the brush head is subjected to an external force, the brush head drives the oscillating rod and the oscillating base to oscillate, and then the resilient abutting-pushing unit is deformed by the force. When the external force applied to the brush head is canceled, the resilient abutting-pushing unit may push the oscillating base and the oscillating rod to the state of initial position under the action of a rebound force, to facilitate subsequent repeat operations.

In an embodiment, the resilient abutting-pushing unit includes a holder mounted on the fixing shaft, an abutting base that abuts against the holder, and an resilient member resilient pushing of the abutting base, with one end of the resilient member abutting against the brush handle, and the other end of the resilient member abutting against the abutting base; and a side surface of the abutting base away from the brush handle is a first flat surface, and a side surface of the holder facing the abutting base is a second flat surface that abuts against the first flat surface.

With this structure, the resilient member applies a rebound force to drive the abutting base to rise under the action of the rebound force, the abutting base pushes the holder during rising until the first flat surface fits with the second flat surface, and then the oscillating base and the oscillating rod oscillate to the state of initial position.

In an embodiment, the brush handle is provided with a guide rod, and the resilient member sleeves over the guide rod.

With this structure, the resilient member may be positioned by means of the guide rod, and failure of the resilient member due to offset of its position is avoided.

In an embodiment, the holder is provided with an accommodating recess for one end of the oscillating rod away from the brush head to insert.

With this structure, the oscillating rod and the holder may be positioned and mounted quickly with a high efficiency by means of the accommodating recess.

In an embodiment, the brush head is provided with a positioning recess for one end of the oscillating rod away from the brush handle to insert; and the oscillating rod is provided with a fastening slot, and a fastening hook that is in snap fit with the fastening slot is mounted on an inner side wall of the positioning recess.

With this structure, the oscillating rod and the brush head may be positioned and connected quickly by means of the positioning recess; and the stability of connection between the oscillating rod and the brush head may be improved through matching between the fastening hook and the fastening slot.

BRIEF DESCRIPTION OF THE DRAWINGS

To describe the embodiments of this application more clearly, the following briefly describes the accompanying drawings The accompanying drawings in the following description show some of the embodiments of this application.

MAIN REFERENCE SIGNS IN THE DRAWINGS

Brush head: 11, positioning recess; 12, fastening hook;
Brush handle: 21, Handle body; 211, first recess; 212, third recess; 213, guide rod; 22, cover; 220, through hole; 221, second recess; 222, fourth recess;
Oscillating base: 31, first hinge base; 311, first journal; 32, second hinge base; 320, elongated hole; 321, second journal; 33, fixing shaft;
Oscillating rod: 41, fastening slot;
Resilient abutting-pushing unit: 51, holder; 511, second flat surface; 512, accommodating recess; 52, abutting base; 521, first flat surface; 53, resilient member.

DETAILED DESCRIPTION OF EMBODIMENTS

To make the embodiments of the application clear, this application is further described in detail below with reference to the accompanying drawings and embodiments. It should be understood that specific embodiments described herein are intended only to explain this application, but not to limit this application.

It should be noted that when an element is referred to as being "fixed to" or "provided on" another element, it may be directly or indirectly placed on the another element. When an element is referred to as being "connected to" another element, it may be directly or indirectly connected to the another element.

In addition, the terms "first", "second", "third", and "fourth" are merely intended for a purpose of description, and shall not be understood as an indication or implication of relative importance or implicit indication of the number of indicated features. Therefore, a feature limited by "first", "second", "third", or "fourth" may explicitly or implicitly include one or more features. In the description of this application, the meaning of "a plurality of" is two or more, unless specifically defined otherwise. The meaning of "some" is one or more, unless specifically defined otherwise.

In the descriptions of this application, it should be understood that the orientations or positional relationships indicated by the terms "center", "length", "width", "thickness", "upper", "lower", "front", "rear", "left", "right", "vertical", "horizontal", "top", "bottom", "inner", "outer", and the like are based on the orientations or positional relationships shown in the accompanying drawings, are merely intended to facilitate the descriptions of this application and simplify the descriptions, are not intended to indicate or imply that the apparatuses or elements mentioned in this application must have specific orientations, or be constructed and operated for a specific orientation, and therefore shall not be construed as a limitation to this application.

In the description of this application, it should be noted that, the term "mount", "engage", and "connect" should be interpreted in the broad sense unless explicitly defined and limited otherwise, which, for example, may mean a fixed connection, a detachable connection or an integral connection: may be a mechanical connection or an electrical connection: may be a direct connection or an indirect connection through an intermediate medium, and may be communication between interiors of two elements or interaction between two elements. The specific meanings of the above terms in this application can be understood according to specific situations.

Reference to "an embodiment" or "embodiments" throughout the specification means that a specific feature, structure or characteristic described in combination with the embodiment is incorporated in at least one embodiment of this application. Thus, the term "in an embodiment" or "in some embodiments" appears throughout the specification, and not all references are to the same embodiment. In addition, in one or more embodiments, specific features, structures, or characteristics may be combined in any suitable manner.

For the convenience of description, three coordinate axes perpendicular to one another in space are defined as an X-axis, a Y-axis and a Z-axis, respectively, while a direction along the X-axis is a longitudinal direction, a direction along the Y-axis is a horizontal direction, and a direction along the Z-axis is a vertical direction: where the X-axis and the Y-axis are two coordinate axes perpendicular to each other in the same horizontal flat surface, and the Z-axis is a coordinate axis in the vertical direction; and the X-axis, the Y-axis and the Z-axis are perpendicular to one another in space to have three flat surfaces, namely an XY flat surface, a YZ flat surface and an XZ flat surface, where the XY flat surface is a horizontal flat surface, the XZ flat surface and the YZ flat surface are both vertical flat surfaces, and the XZ flat surface is perpendicular to the YZ flat surface. The three axes in space are the X-axis, Y-axis and Z-axis. Moving along three axes in space means moving along the three axes that are perpendicular to one another in space, specifically moving along the X-axis, Y-axis and Z-axis in space; and a flat surface movement means moving in the XY flat surface.

Figure 1:
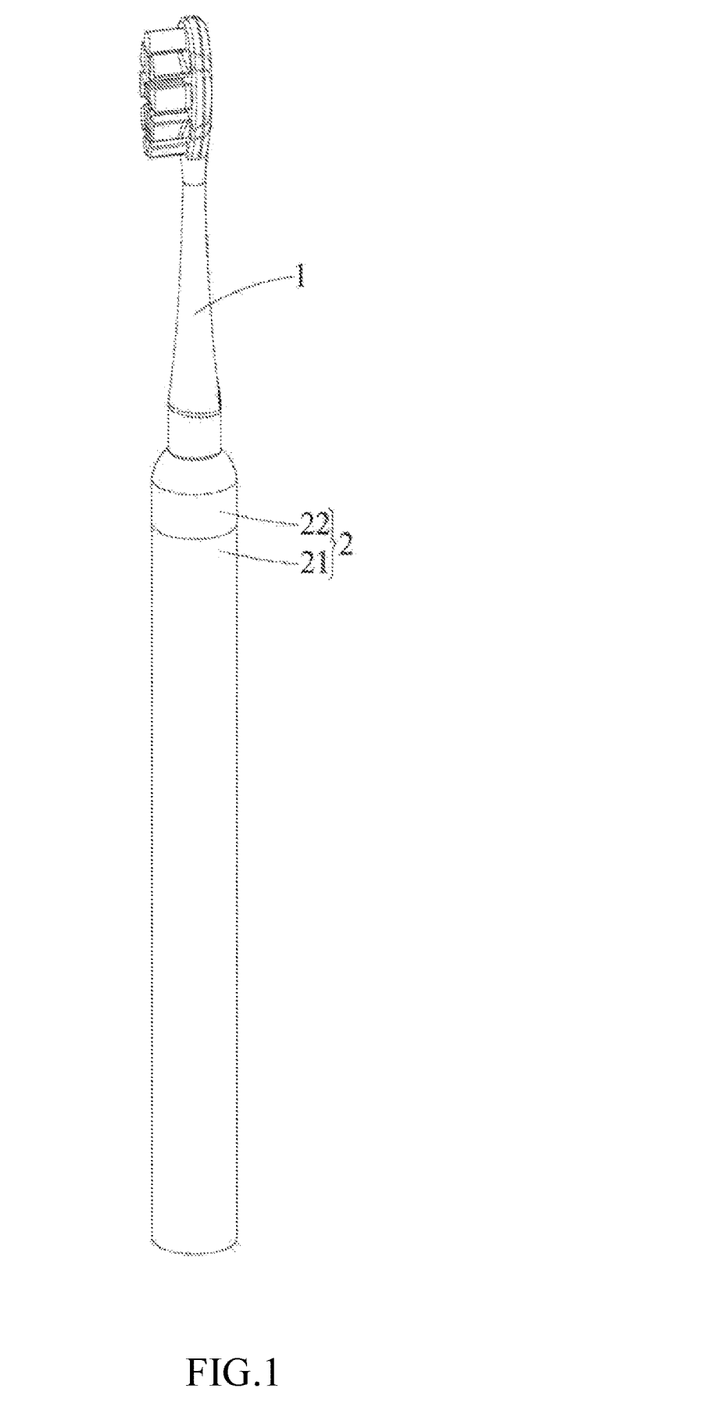
FIG. 1 is a perspective schematic structural diagram of an oscillating toothbrush according to an embodiment of this application.
Figure 2:
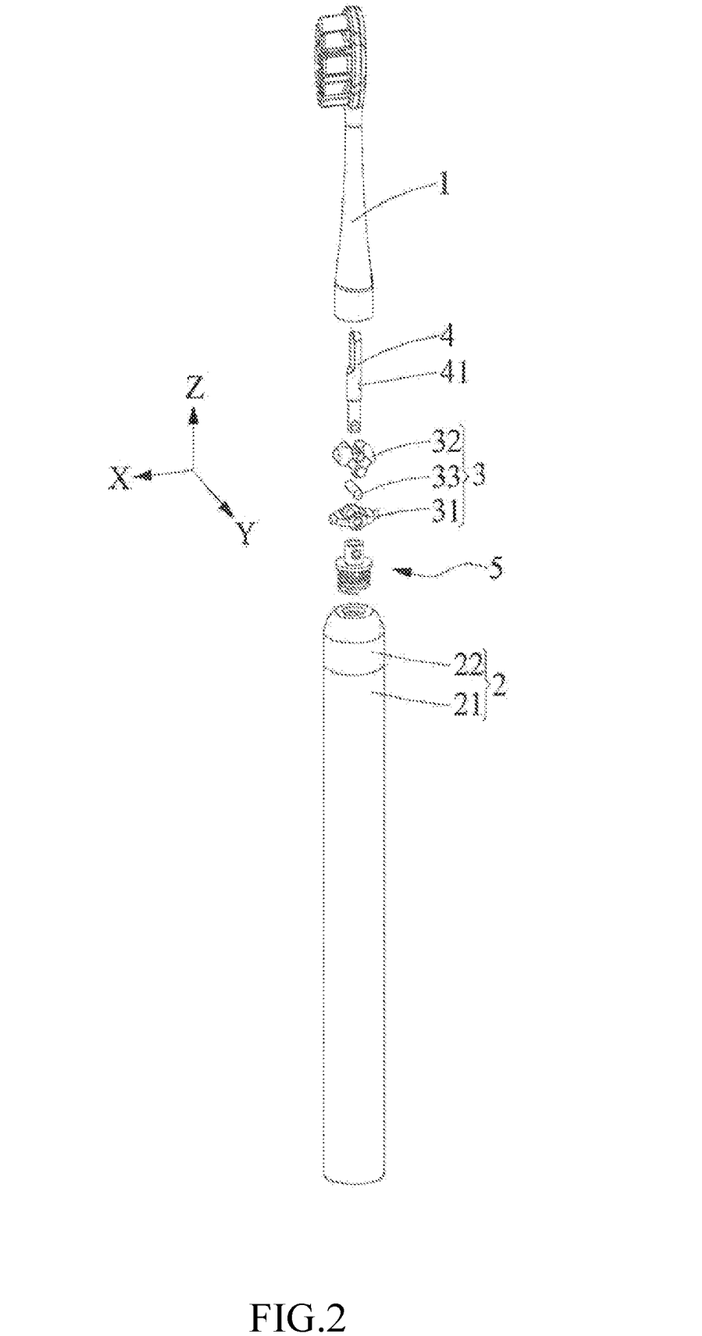
FIG. 2 is a schematic exploded view of FIG. 1.
Figure 3:
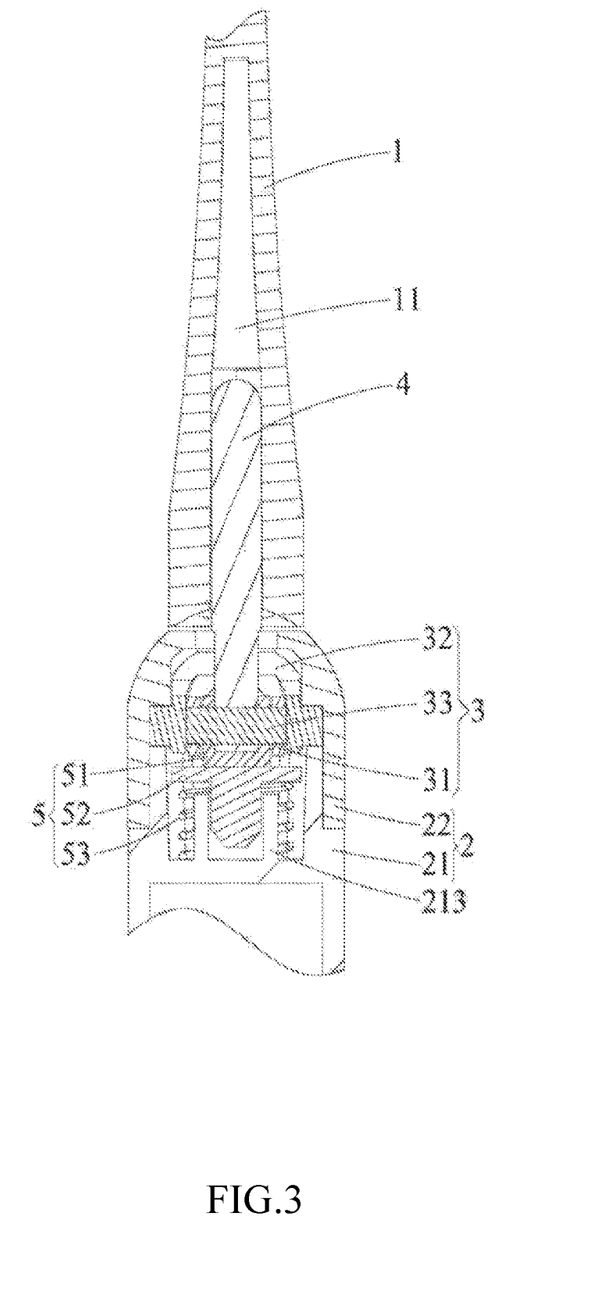
FIG. 3 is a partially schematic sectional view I of an oscillating toothbrush according to an embodiment of this application.

Referring to FIGS. 1 to 3, an oscillating toothbrush according to an embodiment of this application is described. The oscillating toothbrush includes a brush head 1, a brush handle 2, an oscillating base 3 mounted on the brush handle 2, and an oscillating rod 4 that connects the brush head 1 to the oscillating base 3. The oscillating base 3 includes a first hinge base 31 hinged to the brush handle 2 in a first direction (i.e., an X-axis direction in FIG. 2, the same as below), a second hinge base 32 hinged to the brush handle 2 in a second direction (i.e., a Y-axis direction in FIG. 2, the same as below), and a fixing shaft 33 mounted on the first hinge base 31 in the second direction. Here, the first hinge base 31 is hinged to the brush handle 2 in the first direction, meaning that the first hinge base 31 may rotate on the brush handle 2 in the first direction as an axis of rotation. Similarly, the second hinge base 32 is capable of rotating on the brush handle 2 in the second direction as an axis of rotation. The first direction is perpendicular to the second direction. The second hinge base 32 is above the first hinge base 31, and one end of the oscillating rod 4 away from the brush head 1 passes through the second hinge base 32 and sleeves over the fixing shaft 33. The oscillating rod 4 may form an angle with the Z-axis and rotate 360° around the Z-axis.

With this structure, in this application, the oscillating base 3 is arranged to include the first hinge base 31 hinged to the brush handle 2 in the first direction and the second hinge base 32 hinged to the brush handle 2 in the second direction. When the brush head 1 is subjected to an external force, the oscillating rod 4 may drive the first hinge base 31 to oscillate on the brush handle 2 in the first direction. In one embodiment, the oscillating rod 4 oscillates on the fixing shaft 33 in the second direction to further drive the second hinge base 32 to oscillate on the brush handle 2 in the second direction. Therefore, with the oscillation of the first hinge base 31 and the second hinge base 32, the brush head 1 is allowed to oscillate at multiple angles under external forces in different directions, to improve the comfort of toothbrushing.

Figure 6:
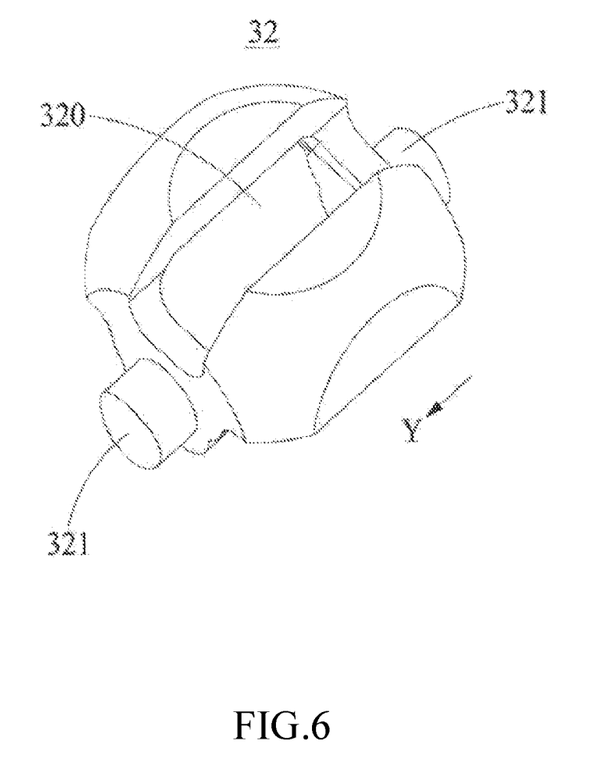
FIG. 6 is a perspective schematic structural diagram of a second hinge base according to an embodiment of this application.

In an embodiment, referring to FIG. 6, as a specific implementation of the oscillating toothbrush according to an embodiment of this application, the second hinge base 32 is provided with an elongated hole 320 for the oscillating rod 4 to pass through, and the direction of major axis of the elongated hole 320 is set along the second direction. With this structure, when the oscillating base 3 oscillates about the first direction, the oscillating base 3 may achieve avoidance in the second direction through the elongated hole 320, and reliability of the brush head 1 oscillating about the first direction is achieved.

Figure 5:
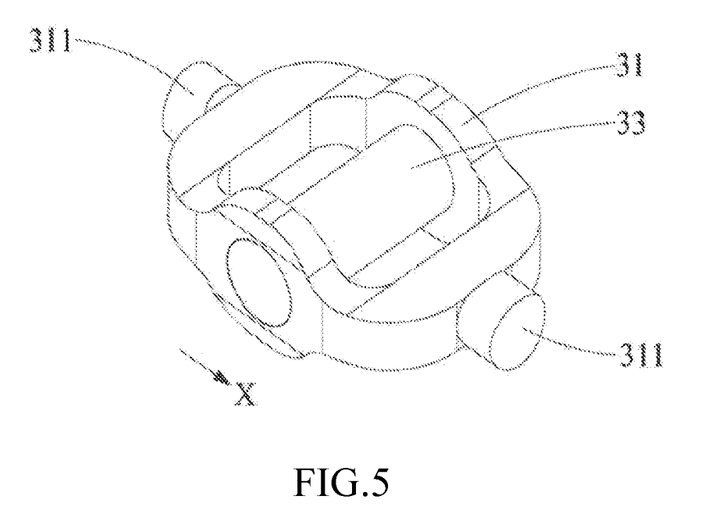
FIG. 5 is a perspective schematic structural diagram of a first hinge base connected to a fixing shaft according to an embodiment of this application.
Figure 7:
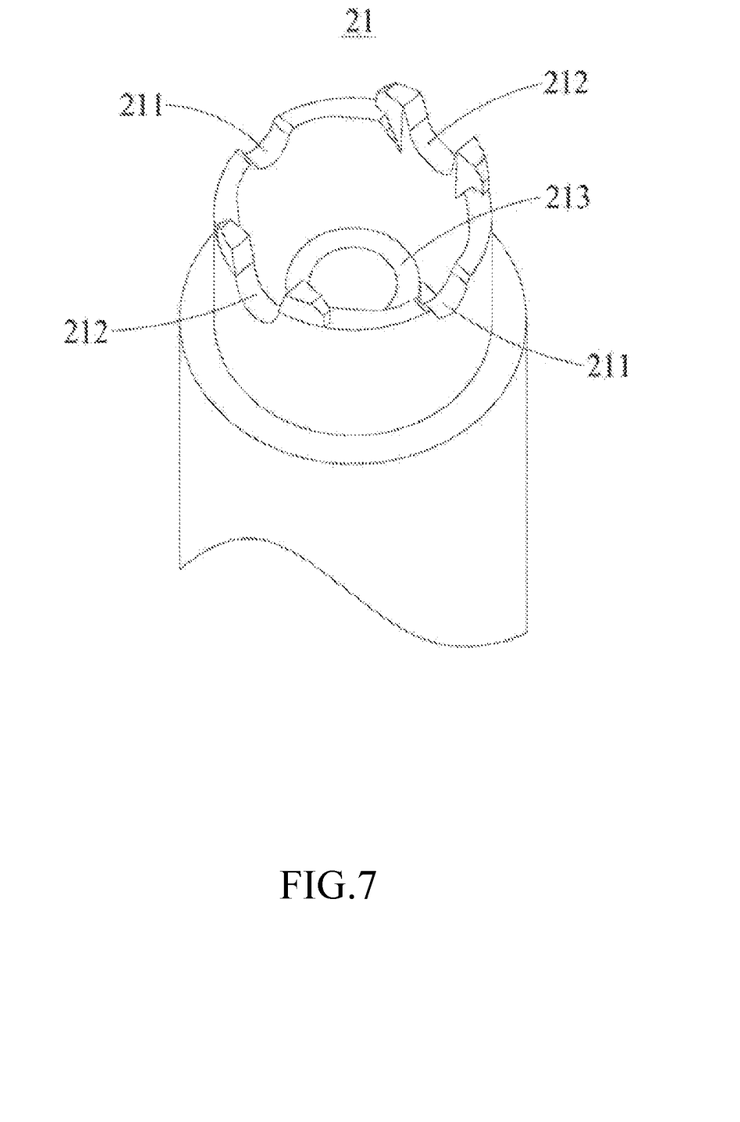
FIG. 7 is a partially perspective schematic structural diagram of a handle body according to an embodiment of this application.
Figure 8:
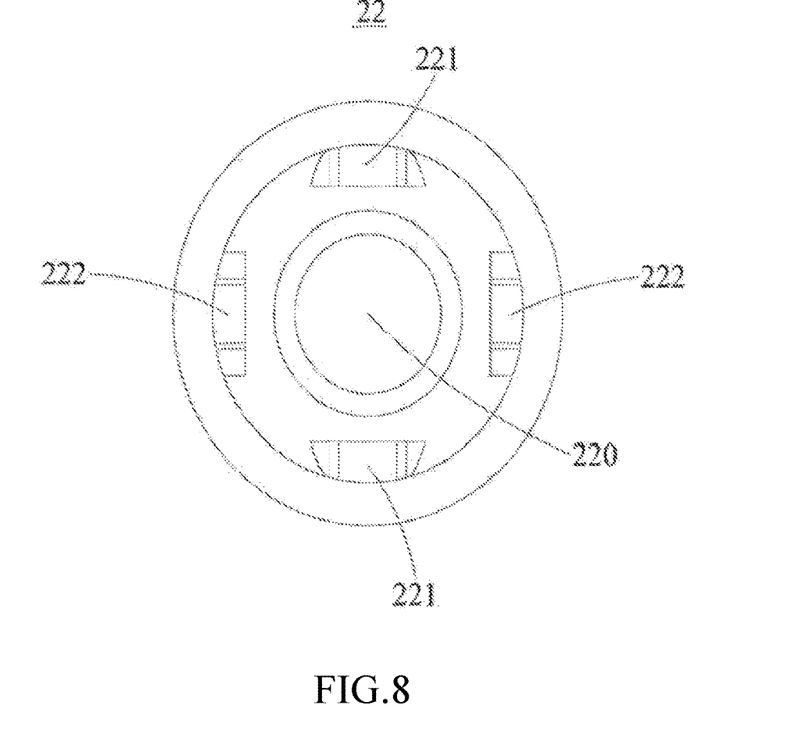
FIG. 8 is a top view of a cover according to an embodiment of this application.

In an embodiment, referring to FIGS. 5, 7 and 8, as a specific implementation of the oscillating toothbrush according to an embodiment of this application, each of two ends of the first hinge base 31 is provided with a first journal 311, and a central axis of the first journal 311 is set in the first direction; and the brush handle 2 includes a handle body 21 and a cover 22 mounted on the handle body 21, the handle body 21 is provided with first recesses 211 at positions corresponding to the first journals 311, and the cover 22 is provided with second recesses 221 that match the respective first recesses 211 to clamp the respective first journals 311. With this structure, the first recesses 211 and the respective second recesses 221 match with each other to clamp the respective first journals 311, and the stability of connection between the first hinge base 31 and the brush handle 2 may be improved, and the reliability of oscillation of the first hinge base 31 may also be improved.

In an embodiment, referring to FIG. 7, the first recesses 211 and the second recesses 221 each may be a semicircular recess and they may fit with the first journals 311 in a cylindrical configuration. In some embodiments, an inner side wall of the brush handle 2 may be provided with blind holes for the first journals 311 to insert respectively, which may also allow the first hinge base 31 to oscillate on the brush handle 2. In other embodiments, the brush handle 2 may be provided with a mounting shaft in the first direction, and the first hinge base 31 may sleeve over the mounting shaft, which may also allow the first hinge base 31 to oscillate. Of course, in other embodiments, a connection structure between the first hinge base 31 and the brush handle 2 may be adjusted according to the actual needs, which is not limited here.

In an embodiment, referring to FIGS. 6 to 8, as a specific implementation of the oscillating toothbrush according to an embodiment of this application, each of two ends of the second hinge base 32 is provided with a second journal 321, and a central axis of the second journal 321 is set along the second direction; and the handle body 21 is provided with third recesses 212 at positions corresponding to the second journals 321, and the cover 22 is provided with fourth recesses 222 that match the third recesses 212 to clamp the respective second journals 321. With this structure, the third recesses 212 and the respective fourth recesses 222 match with each other to clamp the respective second journals 321, and the stability of connection between the second hinge base 32 and the brush handle 2 may be improved, and the reliability of oscillation of the second hinge base 32 may also be improved.

In an embodiment, referring to FIG. 7, the third recesses 212 and the fourth recesses 222 each may be a semicircular recess and they may fit with the second journals 321 in a cylindrical configuration. In some embodiments, an inner side wall of the brush handle 2 may be provided with blind holes for the second journals 321 to insert respectively, which may also allow the second hinge base 32 to oscillate on the brush handle 2. In other embodiments, the brush handle 2 may be provided with a mounting shaft in the second direction, and the second hinge base 32 may sleeve over the mounting shaft, which may also allow the second hinge base 32 to oscillate. Of course, in other embodiments, a connection structure between the second hinge base 32 and the brush handle 2 may be adjusted according to the actual needs, which is not limited here.

In an embodiment, referring to FIGS. 2 and 8, as a specific implementation of the oscillating toothbrush according to an embodiment of this application, the cover 22 is provided with a through hole 220 for the oscillating rod 4 to pass through, and an outer peripheral surface of the oscillating rod 4 is spaced from an inner peripheral surface of the through hole 220. With this structure, the oscillating rod 4 may be stopped by means of an inner side wall of the through hole 220, and an oscillating angle of the oscillating rod 4 may be limited. The oscillating angle of the oscillating rod 4 may be adjusted according to an interval between the outer peripheral surface of the oscillating rod 4 and the inner peripheral surface of the through hole 220. When the interval is large, the oscillating angle of the oscillating rod 4 and the brush head 1 is also large. Conversely, when the interval is small, the oscillating angle of the oscillating rod 4 and the brush head 1 is small.

Figure 4:
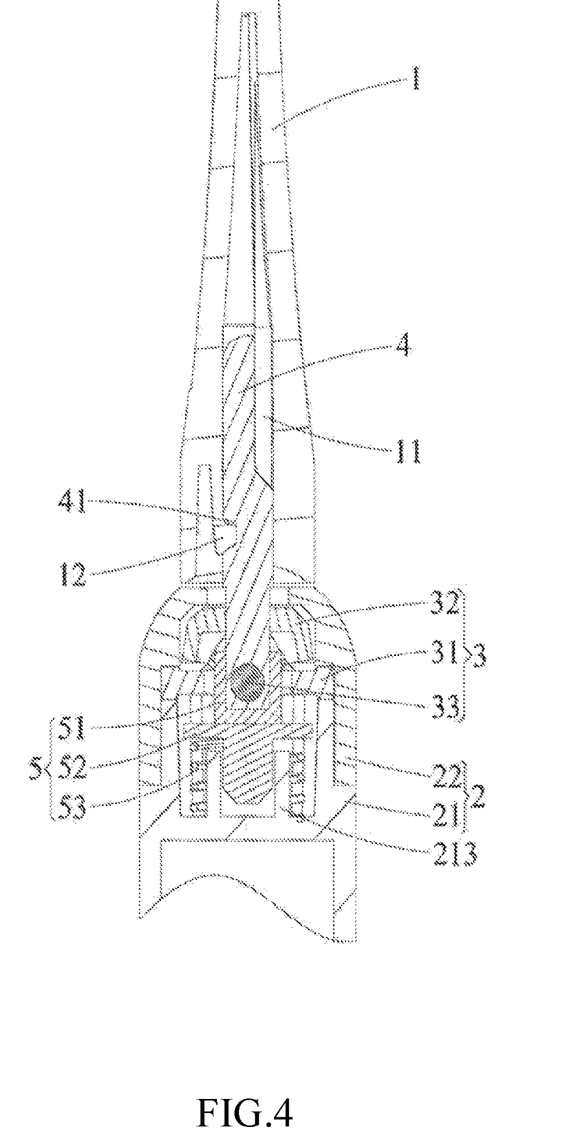
FIG. 4 is a partially schematic sectional view II of an oscillating toothbrush according to an embodiment of this application.

In an embodiment, referring to FIGS. 2 to 4, as a specific implementation of the oscillating toothbrush according to an embodiment of this application, the oscillating toothbrush further includes an resilient abutting-pushing unit 5 for resilient abutting and pushing of the oscillating rod 4 to a state of initial position, with one end of the resilient abutting-pushing unit 5 abutting against the brush handle 2, and the other end of the resilient abutting-pushing unit 5 abutting against the oscillating base 3. With this structure, when the brush head 1 is subjected to an external force, the brush head 1 drives the oscillating rod 4 and the oscillating base 3 to oscillate, and then the resilient abutting-pushing unit 5 is deformed by the force. When the external force applied to the brush head 1 is canceled, the resilient abutting-pushing unit 5 may push the oscillating base 3 and the oscillating rod 4 to the state of initial position under the action of a rebound force, to facilitate subsequent repeat operations. The state of initial position of the oscillating base 3 and the oscillating rod 4 refers to a position state of the brush head 1 when it is not subjected to an external force.

Figure 9:
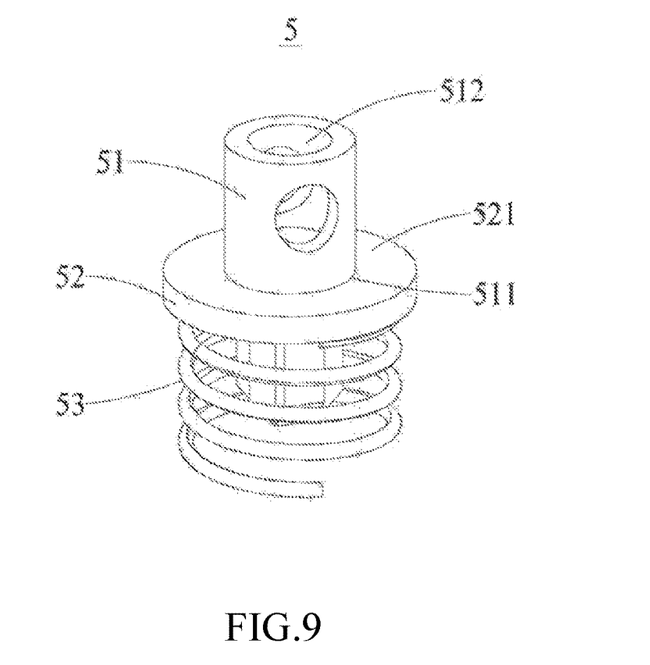
FIG. 9 is a perspective schematic structural diagram of a resilient abutting-pushing unit according to an embodiment of this application.

In an embodiment, referring to FIGS. 3, 4 and 9, as a specific implementation of the oscillating toothbrush according to an embodiment of this application, the resilient abutting-pushing unit 5 includes a holder 51 mounted on the fixing shaft 33, an abutting base 52 that abuts against the holder 51, and an resilient member 53 resilient pushing of the abutting base 52, with one end of the resilient member 53 abutting against the brush handle 2, specifically abutting against the handle body 21, and the other end of the resilient member 53 abutting against the abutting base 52; and a side surface of the abutting base 52 away from the brush handle 2 is a first flat surface 521, and a side surface of the holder 51 facing the abutting base 52 is a second flat surface 511 that abuts against the first flat surface 521. With this structure, when the oscillating rod 4 oscillates through the oscillating base 3, it may drive the holder 51 to oscillate, the first flat surface 521 and the second flat surface 511 on the holder 51 are separated at an angle, and then the holder 51 pushes the abutting base 52 down in the Z-axis direction, and the resilient member 53 is compressed. When the external force applied to the brush head 1 is canceled, the resilient member 53 rebounds along the Z-axis under the action of a rebound force and gives a rebound force to drive the abutting base 52 to rise, and the abutting base 52 pushes the holder 51 during rising until the first flat surface 521 fits with the second flat surface 511, and then, the oscillating base 3 and the oscillating rod 4 oscillate to the state of initial position.

In some embodiments, the resilient abutting-pushing unit 5 may also be a spring or a leaf spring with one end connected to the handle body 21 and the other end connected to the oscillating base 3. Of course, in other embodiments, the structure of the resilient abutting-pushing unit 5 may also be adjusted according to the actual needs, which is not limited here.

In some embodiments, the holder 51 and the oscillating rod 4 may be integrally molded, to facilitate processing and manufacturing. Of course, in other embodiments, the holder 51 may also be separated from the oscillating rod 4, and connected by, such as screw locking, and bonding, which is not limited here.

In an embodiment, referring to FIGS. 3 and 7, as a specific implementation of the oscillating toothbrush according to an embodiment of this application, the brush handle 2 is provided with a guide rod 213, and the resilient member 53 sleeves over the guide rod 213. In one embodiment, the guide rod 213 may be mounted on the handle body 21. The resilient member 53 may be a spring. With this structure, the resilient member 53 may be positioned by means of the guide rod 213, and failure of the resilient member 53 due to offset of its position is avoided. One end of the abutting base 52 away from the holder 51 extends into the guide rod 213, and quick positioning and assembly with a high efficiency can be achieved.

In an embodiment, referring to FIGS. 4 and 9, as a specific implementation of the oscillating toothbrush according to an embodiment of this application, the holder 51 is provided with an accommodating recess 512 for one end of the oscillating rod 4 away from the brush head 1 to insert. With this structure, the oscillating rod 4 and the holder 51 may be positioned and mounted quickly with a high efficiency by means of the accommodating recess 512.

In an embodiment, referring to FIGS. 3 and 4, as a specific implementation of the oscillating toothbrush according to an embodiment of this application, the brush head 1 is provided with a positioning recess 11 for one end of the oscillating rod 4 away from the brush handle 2 to insert; and the oscillating rod 4 is provided with a fastening slot 41, and a fastening hook 12 that is in snap fit with the fastening slot 41 is mounted on an inner side wall of the positioning recess 11. With this structure, the oscillating rod 4 and the brush head 1 may be positioned and connected quickly by means of the positioning recess 11; and the stability of connection between the oscillating rod 4 and the brush head 1 may be improved through matching between the fastening hook 12 and the fastening slot 41.

The foregoing descriptions are merely some embodiments of this application, but are not intended to limit this application. Any modification, equivalent replacement, or improvement made without departing from the spirit and principle of this application shall fall within the scope of protection of this application.

What is claimed is:

1. An oscillating toothbrush, which comprises:
   a brush head, a brush handle, an oscillating base mounted on the brush handle, and an oscillating rod connecting the brush head to the oscillating base, wherein the oscillating base comprises a first hinge base hinged to the brush handle in a first direction, a second hinge base hinged to the brush handle in a second direction, and a fixing shaft mounted on the first hinge base in the second direction; the second hinge base is above the first hinge base, and one end of the oscillating rod away from the brush head passes through the second hinge base and sleeves over the fixing shaft, the first direction being perpendicular to the second direction.

2. The oscillating toothbrush according to claim 1, wherein the second hinge base is provided with an elongated hole for the oscillating rod passes, and the direction of a major axis of the elongated hole is set along the second direction.

3. The oscillating toothbrush according to claim 1, wherein each of two ends of the first hinge base is provided with a first journal, and a central axis of each of the first journals is set along the first direction; and the brush handle comprises a handle body and a cover mounted on the handle body, the handle body is provided with first recesses at positions corresponding to the first journals, and the cover is provided with second recesses that match the respective first recesses to clamp the respective first journals.

4. The oscillating toothbrush according to claim 3, wherein each of two ends of the second hinge base is provided with a second journal, and a central axis of each of the second journals is set along the second direction; and the handle body is provided with third recesses at positions corresponding to the second journals, and the cover is provided with fourth recesses that match the third recesses to clamp the respective second journals.

5. The oscillating toothbrush according to claim 3, wherein the cover is provided with a through hole for the oscillating rod to pass through.

6. The oscillating toothbrush according to claim 1, wherein the oscillating toothbrush further comprises a resilient abutting-pushing unit for resilient pushing of the oscillating rod to a state of initial position, with a first end of the resilient abutting-pushing unit abutting against the brush handle, and a second end of the resilient abutting-pushing unit abutting against the oscillating base.

7. The oscillating toothbrush according to claim 6, wherein the resilient abutting-pushing unit comprises a holder mounted on the fixing shaft, an abutting base that abuts against the holder, and an resilient member resilient pushing of the abutting base, with one end of the resilient member abutting against the brush handle, and the second end of the resilient member abutting against the abutting base; and a side surface of the abutting base away from the brush handle is a first flat surface, and a side surface of the holder facing the abutting base is a second flat surface that abuts against the first flat surface.

8. The oscillating toothbrush according to claim 7, wherein the brush handle is provided with a guide rod, and the resilient member sleeves over the guide rod.

9. The oscillating toothbrush according to claim 7, wherein the holder is provided with an accommodating recess for the one end of the oscillating rod away from the brush head to insert.

10. The oscillating toothbrush according to claim 1, wherein the brush head is provided with a positioning recess for the one end of the oscillating rod away from the brush handle to insert; and the oscillating rod is provided with a fastening slot, and a fastening hook that is in snap fit with the fastening slot is mounted on an inner side wall of the positioning recess.

* * * * *